(12) United States Patent
Ervin

(10) Patent No.: US 7,013,362 B1
(45) Date of Patent: Mar. 14, 2006

(54) SYSTEMS AND METHODS FOR ADDRESSING MEMORY

(75) Inventor: Joseph James Ervin, Stow, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 488 days.

(21) Appl. No.: 10/372,746

(22) Filed: Feb. 21, 2003

(51) Int. Cl.
*G06F 12/06* (2006.01)

(52) U.S. Cl. .......................................... 711/2; 711/202

(58) Field of Classification Search .................... 711/2, 711/202
See application file for complete search history.

(56) References Cited

U.S. PATENT DOCUMENTS

| | | | | |
|---|---|---|---|---|
| 4,445,170 A | * | 4/1984 | Hughes et al. .................. | 711/2 |
| 4,969,086 A | * | 11/1990 | Pfeiffer et al. .................. | 711/2 |
| 5,144,692 A | | 9/1992 | Baker et al. .................. | 395/425 |
| 5,325,517 A | | 6/1994 | Baker et al. .................. | 395/575 |
| 5,388,215 A | | 2/1995 | Baker et al. .................. | 395/200 |
| 5,652,890 A | | 7/1997 | Foster et al. .................. | 395/750 |
| 6,717,222 B1 | | 4/2004 | Zhang .......................... | 257/390 |

* cited by examiner

*Primary Examiner*—Jack Lane
(74) *Attorney, Agent, or Firm*—BainwoodHuang; David E. Huang, Esq.

(57) ABSTRACT

An addressing circuit includes a first set of inputs configured to receive a first set of address signals en route from the set of processors to the memory and defining a least significant address portion. The addressing circuit further includes a second set of inputs configured to intercept a second set of address signals en route from the set of processors to the memory and defining a most significant address portion. The addressing circuit also includes control circuitry configured to output a replacement set of address signals to the memory in place of the second set of address signals. The replacement set of address signals defines either the most significant address portion defined by the second set of address signals when the least significant address portion is outside a predetermined range, or a predefined most significant address portion when the least significant address portion is within the predetermined range.

33 Claims, 9 Drawing Sheets

SYSTEMS AND METHODS FOR ADDRESSING MEMORY

BACKGROUND OF THE INVENTION

A typical computer system includes a processor, memory (e.g., semiconductor memory, disk drive memory, etc.) and a bus that connects the processor to the memory. The bus typically includes control lines, address lines and data lines. During normal operation, the processor places a command on the control lines and an address on the address lines in order to access a particular location within the memory. If the command is a read instruction, the memory responds by placing data (e.g., general data, executable code, etc.) onto the data lines from the particular location of the memory and the processor subsequently reads that data from the data lines. If the command is a write instruction, the processor places data onto the data lines and the memory responds by storing the data in the particular location of the memory.

Before the processor begins normal operation, the processor typically performs a startup sequence (i.e., a series of routines) in order to initialize internal circuitry and output lines, as well as to reach a steady and consistent operating state. It is common for the processor to perform this startup sequence in response to a special event such as immediately after powering up, after receiving a reset signal, and after encountering an exception or fault event (e.g., a branch into an error condition). If the processor does not perform the startup sequence following such an event, the operating state and the output signals of the processor will be unreliable.

In general, when the processor performs the startup sequence, the processor executes special code called firmware stored in Programmable Read Only Memory (PROM). The processor typically retrieves this firmware from a base region of the PROM by (i) asserting command and address lines and (ii) reading data lines in a manner similar to that described above for accessing primary and secondary memory during normal operation. Manufacturers of computer systems often store other memory constructs in the firmware within the PROM as well, such as routines for handling various traps and software conditions, update and diagnostic routines, etc.

In some situations, subsequent versions of the firmware may outgrow the native memory capacity of the processor, i.e., the memory space which is addressable using only the standard address lines of the processor. For example, for a particular computer system design, suppose that a processor has exactly 20 standard address lines and thus is capable of addressing one megabyte of native memory space (i.e., $2^2$ bytes of memory). In such a situation, if the firmware fits within one megabyte of memory space, the processor is capable of addressing all of the firmware using the 20 standard address lines. However, if the firmware is larger than one megabyte of memory space (i.e., if the firmware exceeds the native memory capacity of the processor), the manufacturer must then provide a mechanism that enables the processor to access a memory space which is larger than the processor's native memory capacity so that the processor has access to all of the firmware.

There are a variety of conventional approaches to modifying a computer system design to expand the size of addressable memory space beyond the processor's initial native memory capacity. One conventional approach to modifying the computer system design (which is hereinafter referred to as the "new processor approach") involves replacing the processor of the initial design with a new processor having more standard address lines and thus greater addressing capabilities. Accordingly, in this approach, the manufacturer essentially increases the native memory capacity beyond the initial native memory capacity.

Another conventional approach to modifying a computer system design to expand the size of addressable memory space beyond the processor's initial native memory capacity (which is hereinafter referred to as the "simple GPIO line approach") involves utilizing general purpose input/output lines (i.e., GPIO lines) of the processor as additional address lines. In this approach, the manufacturer provides code (e.g., an application) which directs the processor to operate the GPIO lines as higher order address lines, i.e., as address lines carrying the most significant address bits. This approach places the GPIO lines of the processor under software control so that the GPIO lines, in combination with the standard address lines of the processor, provide addresses for addressing a memory space that is larger than the native memory capacity of the processor.

SUMMARY

Unfortunately, there are deficiencies to the above-described conventional approaches to modifying a computer system design to expand the size of addressable memory space beyond the processor's initial native memory capacity. For example, in the above-described conventional new processor approach which involves replacing the initial processor with a processor with more standard address lines, the cost of changing processors is often impractical to implement simply in order to accommodate a larger version of firmware. In particular, replacement of the initial processor is a significant design change and typically requires extensive re-testing (e.g., compatibility testing, functional verification testing, etc.) and a substantial increase in costs. The effects of such a design change would be even further exacerbated for a computer system that uses multiple processors.

Additionally, the above-described conventional simple GPIO line approach, which involves simply placing the GPIO lines of the processor under software control to operate as additional address lines, is not well-suited for accessing a PROM containing startup code. For example, suppose that a processor of a computer system has both its GPIO lines and its standard address lines connected to the address lines of a PROM so that the processor is capable of (i) selecting pages within the PROM by sending high order address signals to the PROM on the GPIO lines, and (ii) selecting memory locations within the selected pages by sending low order address signals to the PROM on the standard address lines. Additionally, suppose that the PROM stores a startup procedure that reliably places the GPIO lines of the processor under software control. Initially, when the processor powers up, the GPIO lines are not yet reliably under software control. Accordingly, when the processor attempts to access the startup procedure from the PROM, the processor could inadvertently read data from the wrong page if one or more of the GPIO lines is initially in an incorrect state. Moreover, fault conditions that place the GPIO lines into unreliable states would thus interfere with the addressing of various entry points for routines that handle the various traps and exceptions thus causing exception handling to be unreliable.

There are further drawbacks to the conventional simple GPIO line approach if the computer system includes multiple processors. For example, unless the GPIO lines of each processor are reliably under software control, there is no mechanism that prevents the processors from contending with each other during memory access operations. In particular, even if the GPIO lines of a first processor are reliable, memory access operations of the first processor are susceptible to unreliable GPIO lines of other processors. More specifically, when the first processor attempts to access memory, a second processor (which does not yet have its GPIO lines reliably under software control) may concurrently assert its GPIO lines thus inadvertently corrupting the memory access operation of the first processor (e.g., causing the first processor to read data from the wrong page of memory). Accordingly, the conventional approach of simply using GPIO lines as additional address lines is not well-suited for multi-processor systems.

Embodiments of the invention are directed to techniques for controlling processor access to a set of memory segments. In particular, an addressing circuit optionally replaces portions of addresses from a set of processors such that any attempt to address a particular memory segment range (i.e., a special area) of a memory segment results in access within the particular memory segment range of a predefined memory segment. Such techniques are suitable for guiding the processors to important data in that range of the predefined memory segment (e.g., critical startup sequence code) in a reliable and consistent manner even if the processors initially provide the portions of the addresses on GPIO lines that are not yet reliably under software control. Moreover, the techniques enable manufacturers to utilize GPIO lines as additional address lines, thus alleviating the need to replace processors with new processors having more address lines when the manufacturers provide new versions of firmware that exceed the native memory capacities of the processors.

One embodiment of the invention is directed to an addressing circuit for addressing memory (e.g., Programmable Read Only Memory). The addressing circuit includes a first set of inputs configured to receive a first set of address signals (e.g., standard address line signals) en route from the set of processors to the memory, the first set of address signals defining a least significant address portion. The addressing circuit further includes a second set of inputs configured to intercept a second set of address signals (e.g., GPIO line signals) en route from the set of processors to the memory, the second set of address signals defining a most significant address portion. The addressing circuit also includes control circuitry coupled to the first and second sets of inputs. The control circuitry is configured to output a replacement set of address signals to the memory in place of the second set of address signals. The replacement set of address signals defines either the most significant address portion defined by the second set of address signals when the least significant address portion is outside a predetermined range, or a predefined most significant address portion when the least significant address portion is within the predetermined range. This embodiment is multi-processor compatible and extends the addressing capabilities of the processors beyond their native memory capacity.

In one arrangement, the control circuitry includes front-end circuitry configured to generate an access signal based on the first set of address signals (e.g., compare circuitry which is configured to make a comparison between the predetermined range and the least significant address portion defined by the first set of address signals). The access signal indicates whether the least significant address portion is outside the predetermined range. The control circuitry further includes back-end circuitry configured to form the replacement set of address signals based on the access signal (e.g., a set of logical AND gates for selectively masking the second set of address signals). Accordingly, the control circuitry is straight forward to implement using combinatorial digital logic.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for controlling processor access to a set of memory segments. In particular, an addressing circuit replaces portions of addresses from a set of processors such that any attempt to address a memory location within a particular memory segment range (i.e., a special area) results in access of a memory location from that range within a predefined memory segment. Such techniques are well-suited for directing the processors to important information in the particular memory segment range of the predefined memory segment (e.g., code for a startup procedure) in a reliable and consistent manner even if the processors initially provide the portions of the addresses on GPIO lines that are not yet reliably under software control. Moreover, such techniques enable manufacturers to utilize GPIO lines as additional address lines, thus alleviating the need to replace processors with new processors having more standard address lines when the manufacturers provide new versions of firmware that exceed the native memory capacities of the processors.

Figure 1:
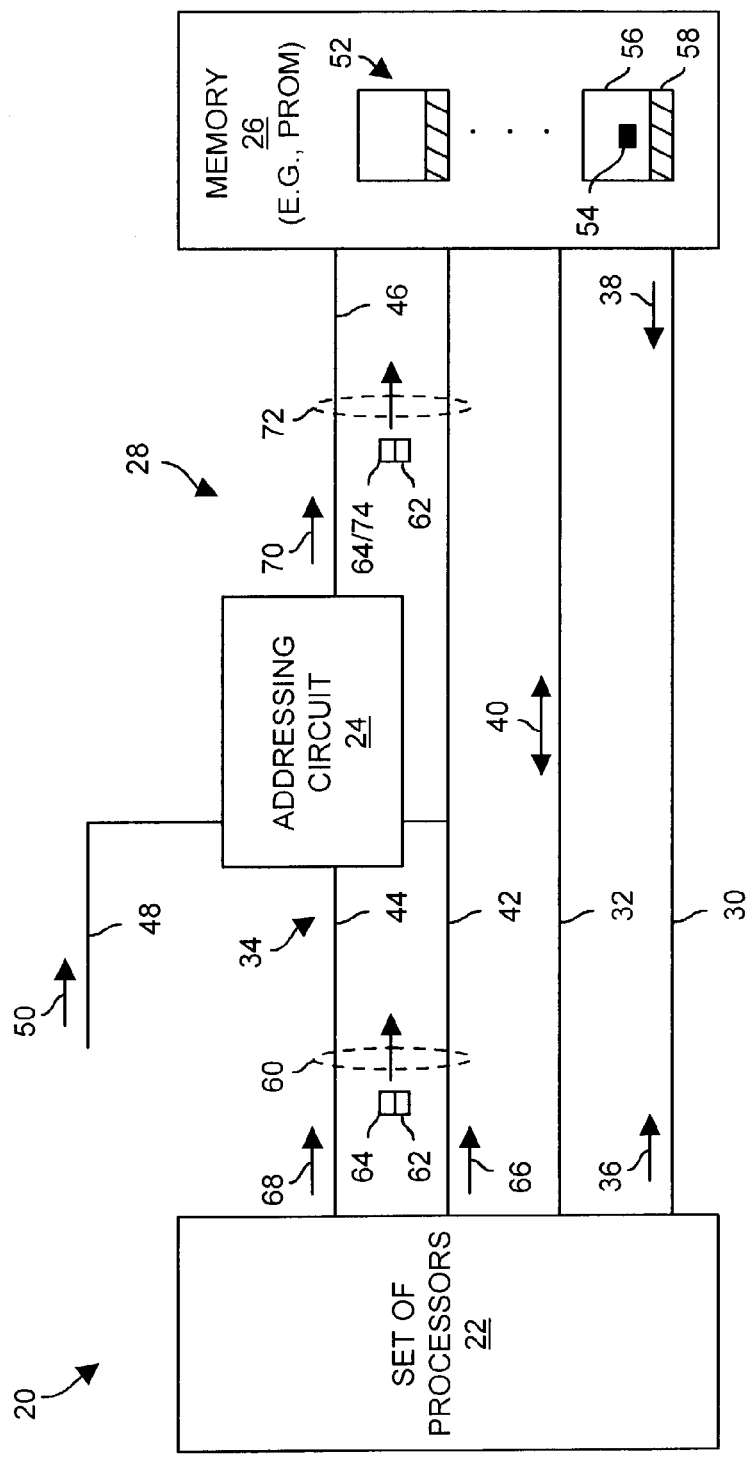
FIG. 1 is a block diagram of a computerized system which is suitable for use by the invention.

FIG. 1 shows a computerized system 20 which is suitable for use by the invention. The computerized system 20 includes a set of processors 22 (i.e., one or more processors), an addressing circuit 24, memory 26 and a set of connections 28. The set of connections 28 includes a control/status bus 30, a data bus 32 and an address bus 34. The control/status bus 30 interconnects between the set of processors 22 and the memory 26 to convey commands 36 (e.g., read and write instructions) and response signals 38 (e.g., confirmation messages) between the set of processors 22 and the memory 26. Similarly, the data bus 32 interconnects between the set of processors 22 and the memory 26 to convey data 40 (e.g., general data, executable code, etc.) between the set of processors 22 and the memory 26 in tandem with the commands 36.

The address bus 34 includes a first set of address lines 42 which connects to each of (i) the set of processors 22, (ii) the addressing circuit 24 and (iii) the memory 26. The address bus 34 further includes a second set of address lines 44 that interconnects between the set of processors 22 and the addressing circuit 24, and a third set of address lines 46 that interconnects between the addressing circuit 24 and the memory 26.

The addressing circuit 24 has a control signal input line 48 which is configured to receive a control signal 50. When the control signal 50 on the control signal input line 48 has a first value (e.g., a low voltage), the control signal 50 directs the addressing circuit 24 to operate in a normal operating mode. When the control signal 50 has a second value (e.g., a high voltage), the control signal 50 directs the addressing circuit 24 to operate in an override mode that essentially bypasses the operation of the addressing circuit 24.

The memory 26 includes multiple memory segments 52 (e.g., pages) containing memory locations 54 (e.g., bytes) which are accessible to the set of processors 22. In particular, each memory segment 52 includes an identical number of memory locations 54 which are partitioned into a normal area 56 and a special area 58 in a consistent manner from memory segment 52 to memory segment 52. As will be explained in further detail later, the memory locations 54 within the special area 58 of a predefined memory segment 52 are well-suited for storing important information such as a startup sequence for the set of processors 22.

During operation of the computerized system 20, the set of processors 22 is configured to provide commands 36 onto the control/status bus 30 and addresses 60 onto the address bus 34 (see the dashed oval 60 in FIG. 1) in order to access the memory locations 54 within the memory 26. For example, to read from a particular memory location 54 of the memory 26, a processor 22 provides a read command 36 onto the control/status bus 30 and concurrently provides an address 60 identifying that memory location 54 onto the address bus 34. The address 60 includes a least significant address portion 62 and a most significant address portion 64. The least significant address portion 62 is a set of low order bits of the address 60 (i.e., one or more low order address bits). Similarly, the most significant address portion 64 is a set of high order address bits of the address 60 (i.e., one or more high order address bits).

When the processor 22 provides the address 60, the processor 22 outputs a set of address signals 66 defining the least significant address portion 62 onto the set of address lines 42, and a set of address signals 68 defining the most significant address portion 64 onto the set of address lines 44. Since both the addressing circuit 24 and the memory 26 are connected to the set of address lines 42, both the addressing circuit 24 and the memory 26 receive the set of address signals 66 defining the least significant address portion 62 of the address 60. However, since the addressing circuit 24 is connected to the set of address lines 44 but the memory 26 is not connected to the set of address lines 44, only the address circuit 24 receives the set of address signals 68 defining the most significant address portion 64 of the address 60. That is, the memory 26 does not receive the set of address signals 68.

Regardless of whether the addressing circuit 24 operates in the normal operating mode or in the override mode, the addressing circuit 24 provides a replacement set of address signals 70 onto the set of address lines 46 in response to the sets of address signals 66, 68. The replacement set of address signals 70 on the set of address lines 46, in combination with the set of address signals 66 on the set of address lines 42, forms a new address 72 for use by the memory 26 (see the dashed oval 72 in FIG. 1). Accordingly, when the processor 22 provides the address 60, the operation of the addressing circuit 24 causes the memory 26 to receive the new address 72.

A description of the operation of the addressing circuit 24 in each mode will now be provided. When the addressing circuit 24 operates in the normal operating mode, the address circuit 24 receives, as an address 60 from the set of processors 22, both the set of address signals 66 defining the least significant address portion 62, and the set of address signals 68 defining the most significant address portion 64. The most significant address portion 64 identifies a particular memory segment 52 within the memory 26, and the least significant address portion 62 identifies a particular memory location 54 within the identified memory segment 52.

If the memory location 54 identified by the least significant address portion 62 falls within the normal area 56 of a memory segment 52, the addressing circuit 24 generates the replacement set of address signals 70 such that the replacement set of address signals 70 mirrors the set of address signals 68. As a result, the replacement set of address signals 70 defines the most significant address portion 64 from the original address 60, and the new address 72 is the same as the original address 60.

However, if the memory location 54 identified by the set of address signals 66 falls within the special area 58 of a memory segment 52, the addressing circuit 24 generates the replacement set of address signals 70 such that the replacement set of address signals 70 defines a most significant address portion 74 identifying a predefined memory segment 52 which may or may not be the same memory segment 52 identified by the most significant address portion 64. As a result, while the addressing circuit 24 is in the normal operating mode, any time a processor 22 attempts to address memory locations 54 within the special area 58 of any memory segments 52 the addressing circuit 24 steers memory access to the special area 58 of the predefined memory segment 52.

It should be understood that the above-described operation of the computerized system 20 makes the special area 58 of the predefined memory segment 52 well-suited for storing important data such as a startup procedure for the set of processors 22. For example, suppose that the standard address lines of the set of processors 22 connect to the set of address lines 42 of the address bus 34. Further suppose that processor GPIO lines of the set of processors 22, which are used as additional software-controlled address lines to expand the addressable memory space beyond the native memory capacity of the set of processors 22, connect to the set of address lines 44 of the address bus 34. Moreover, suppose that the special area 58 of the predefined memory segment 52 stores code for a startup sequence that, when executed by a processor 22, places the GPIO lines of that processor 22 reliably under software control (e.g., the startup sequence eventually CALLs an application that operates the GPIO lines as high order address lines). In this situation, each processor 22 is capable of reliably accessing the special area 58 of the predefined memory segment 52 even if the GPIO lines of the processors 22 presently are not yet under software control. In particular, if a processor 22 inadvertently asserts its GPIO line incorrectly while any of the processors 22 attempts to address and read from the special area 58 of the predefined memory segment 52, the addressing circuit 24 provides the replacement set of address signals 70, i.e., the most significant address portion 74 identifying the predefined memory segment 52. Accordingly, the addressing circuit 24 ensures proper identification of the predefined memory segment 52 and there is no risk of inadvertently identifying the wrong memory segment 52 while accessing the startup sequence due to a GPIO line being in an improper state.

When the addressing circuit 24 operates in the override operating mode (i.e., in response to the control signal 50), the operation of the addressing circuit 24 is essentially disabled and the replacement set of address signals 70 simply mirrors the set of address signals 68 provided by the set of processors 22. In this situation, the addressing circuit 24 operates as a pass-through device and any new addresses 72 formed by the combination of the replacement set of address signals 70 and the set of address signals 66 are the same as the original addresses 60 sent by the set of processors 22. As will be explained in further detail later, the override mode is well-suited for use by the computerized system 20 when taking a failsafe measure prior to upgrading information within the memory 26. Further details of the invention will now be provided with reference to FIG. 2.

Figure 2:
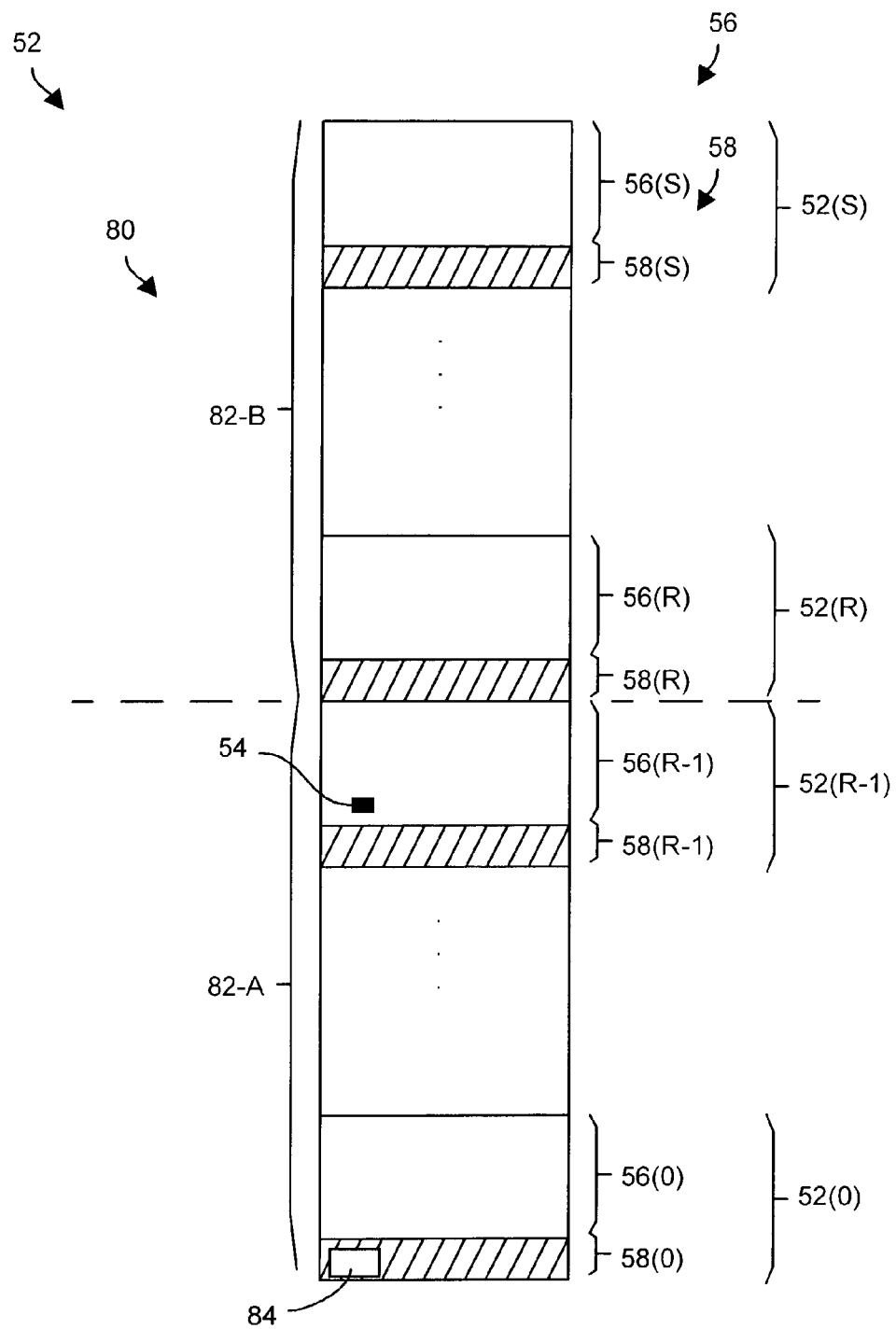
FIG. 2 is a block diagram of a memory space layout which is suitable for use by the computerized system of FIG. 1.

FIG. 2 is a general mapping of the memory segments 52 within the memory 26. As shown, the memory segments 52 form a contiguous memory space 80 having a lower half 82-A (i.e., memory segments 52(0) through 52(R−1)) and an upper half 82-B (i.e., memory segments 52(R) through 52(S)). Accordingly, the entire memory space 80 spans memory segments 52(0) through 52(S) and is accessible using a paged memory scheme.

As mentioned earlier, the replacement set of address signals 70 (FIG. 1) defines a most significant address portion identifying the memory segments 52 of the memory 26. Under normal conditions, the memory segment 52 with the lowest address is the base memory segment 52(0). From there, the memory segments 52 increase contiguously in a page-by-page manner to the memory segment 52 with the highest address which is the memory segment 52(S).

Additionally, as mentioned earlier, each memory segment 52 includes a normal area 56 and a special area 58. For example, the base memory segment 52(0) has a normal area 56(0) and a special area 58(0). Similarly, the memory segment 54(R−1) has a normal area, 56(R−1) and a special area 58(R−1), and so on. The normal areas 56 and the special areas 58 are consistently located from memory segment 52 to memory segment 52 (i.e., the areas 56, 58 have consistent offsets).

By way of example only, the base memory segment 52(0) of the memory space 80 is configured as the predefined memory segment 52. As such, when the addressing circuit 24 operates in the normal operating mode and receives a least significant address portion 62 (FIG. 1) defining a memory location 54 within a special area 58, the addressing circuit 24 identifies the base memory segment 52(0) using the replacement set of addressing signals 70. Accordingly, the special area 58(0) of the base memory segment 52(0) is very well-suited for storing code for a startup sequence 84 (see FIG. 2) when GPIO lines of the set of processors 22 are configured to provide the most significant address portions 62 of the addresses 60. In particular, even if the GPIO lines are not reliably under software control (e.g., immediately after the computerized system 20 is turned on, after an exception or fault event, etc.), the operation of the addressing circuit 24 enables the set of processors 22 to reliably access the code for the startup sequence 84 within the special area 58(0).

It should be understood that, when the addressing circuit 24 operates in the normal operating mode, the special areas 58 of all of the memory segments 52 except for the special area 58(0) of the base memory segment 52(0) are unavailable for access by the set of processors 22. That is, the addressing circuit 24 steers the set of processors 22 to the special area 58(0) of the base memory segment 52(0) whenever the addressing circuit 24 encounters an address 60 identifying a special area 58. Accordingly, the addressing circuit 24 essentially aliases all of the special areas 58 to the special area 58(0) of the base memory segment 52(0). However, when the addressing circuit 24 operates in the override mode, the set of processors 22 are capable of accessing the special area 58 of any memory segment 52 since the addressing circuit 24 now operates as a simple pass-through device. Further details of the addressing circuit 24 will now be provided with reference to FIGS. 3 through 5.

Figure 3:
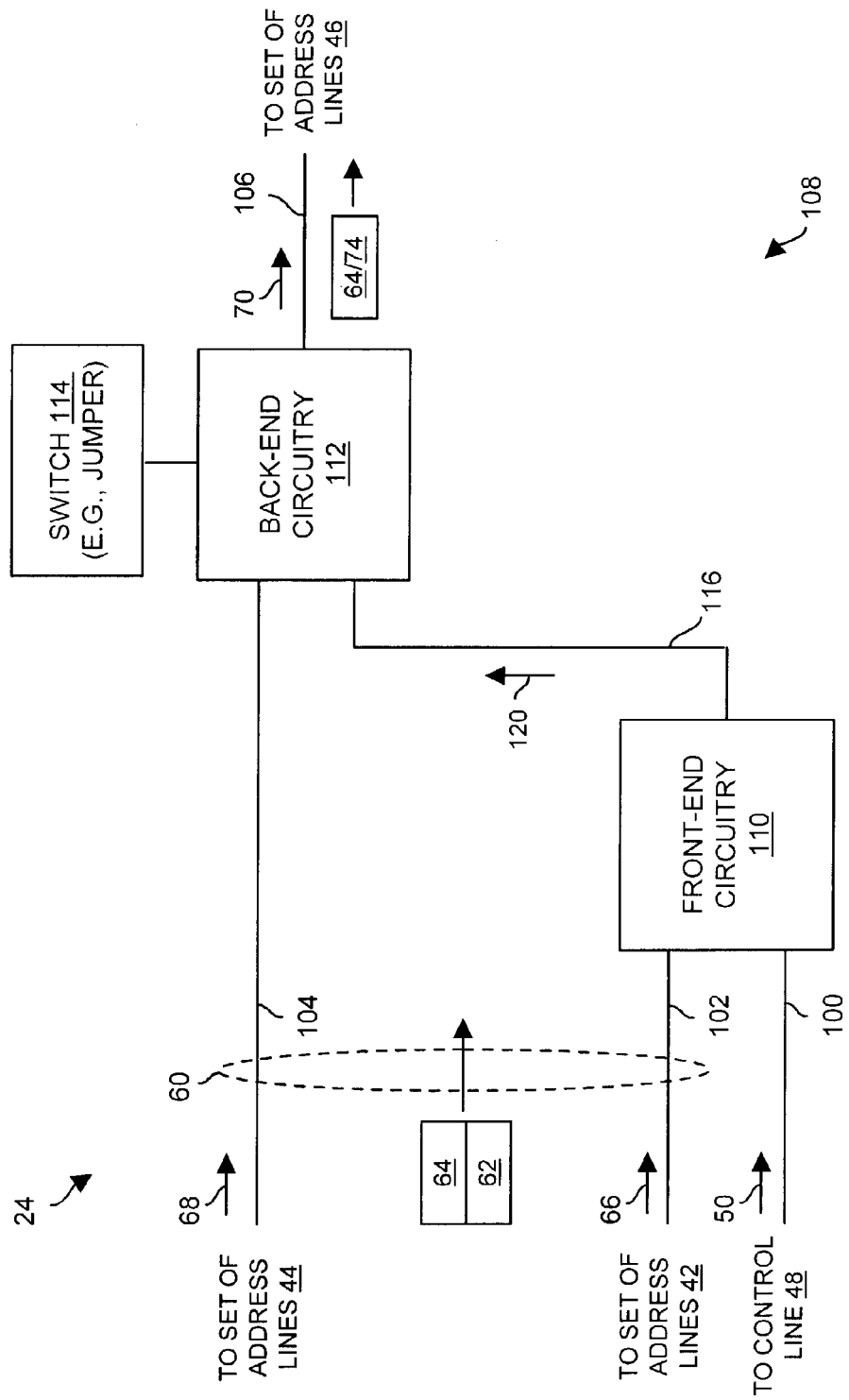
FIG. 3 is a block diagram of an addressing circuit of the computerized system of FIG. 1.

FIG. 3 shows a block diagram of the addressing circuit 24 which is capable of being implemented in a modularized manner with its own set of inputs and outputs (e.g., contacts, traces, pads, pins, etc.). As shown, the addressing circuit 24 includes a control line 100, a first set of inputs 102, a second set of inputs 104, a set of outputs 106, and internal control circuitry 108. The internal control circuitry 108 includes front-end circuitry 110, back-end circuitry 112, a switch 114 and a connection 116. The front-end circuitry 110 connects to the control line 100, the first set of inputs 102 and the connection 116. The back-end circuitry 112 connects to the second set of inputs 104, the switch 114, the connection 116 and the set of outputs 106.

When the addressing circuit 24 is installed within the computerized system 20, the control line 100 connects to the control signal input line 48 (also see FIG. 1) in order to carry the control signal 50 that selectively directs the addressing circuit 24 to operate in either the normal operating mode or the override mode. The first set of inputs 102 connects to the set of address lines 42 of the address bus 34 (FIG. 1) in order to carry the set of address signals 66 defining the least significant address portions 62 of the addresses 60. Similarly, the second set of inputs 104 connects to the set of address lines 44 of the address bus 34 (FIG. 1) in order to carry the set of address signals 68 defining the most significant address portion 64. The set of outputs 106 connects to the set of address lines 46 of the address bus 34 (FIG. 1) in order to provide the replacement set of address signals 70 defining the high order address bits of the addresses 72 (FIG. 1) to the set of address lines 46. As explained earlier, these high order address bits are either (i) the most significant address portion 64 from the set of processors 22 or (ii) the most significant address portions 74 depending on whether the least significant address portion 62 falls within the special area 58 of a memory segment 52.

The general operation of the particular components within the addressing circuit 24, while in the normal operating mode, will now be explained. For each address 60 from the set of processors 22, the addressing circuit 24 provides the replacement set of signals 70 which identifies one of the memory segments 52 within the memory 26. To this end, the front-end circuitry 110 compares the least significant address portion 62 of each address 60 with a predefined range corresponding to the special areas 58 of the memory segments 52, and outputs an access signal 120 on the connection 116 based on the comparison. When the least significant address portion 62 of an address 60 falls outside the predefined range (i.e., when the set of address signals 66 identifies a memory location 54 within the normal area 56 of a memory segment 52), the front-end circuitry 110 provides the access signal 120 with a first value (e.g., a high voltage). On the other hand, when the least significant address 62 portion of the address 60 falls within the predefined range (i.e., when the set of address signals 66 identifies a memory location 54 within the special area 58 of a memory segment 52), the front-end circuitry 110 provides the access signal 120 with a second value (e.g., a low voltage).

The back-end circuitry 112 generates the replacement set of signals 70 based on the access signal 120 received from the connection 116. In particular, when the access signal 120 has the first value indicating that the least significant address portion 62 of the address 60 falls within the normal area 56 of a memory segment 52, the back-end circuitry 112 outputs the replacement set of signals 70 such that the replacement set of signals 70 mirrors the set of address signals 68 from the set of processors 22. Accordingly, the resulting address 72 is the same as the address 60 (FIG. 1), and the memory 26 accesses a memory location 54 within a normal area 56 of a memory segment 52 identified by that address 72.

However, when the access signal 120 has the second value indicating that the least significant address portion 62 of the address 60 falls within the special area 58 of a memory segment 52, the back-end circuitry 112 outputs the replacement set of signals 70 such that the replacement set of signals 70 identify the predefined memory segment 52. Accordingly, the resulting address 72 is not necessarily the same as the address 60 provided by the set of processors 22, and the memory 26 accesses a memory location 54 within the special area 58 of the predefined memory segment 52 identified by the address 72 (see the memory segment 52(0) in FIG. 2). Further details of the front-end circuitry 110 will now be provided with reference to FIG. 4.

Figure 4:
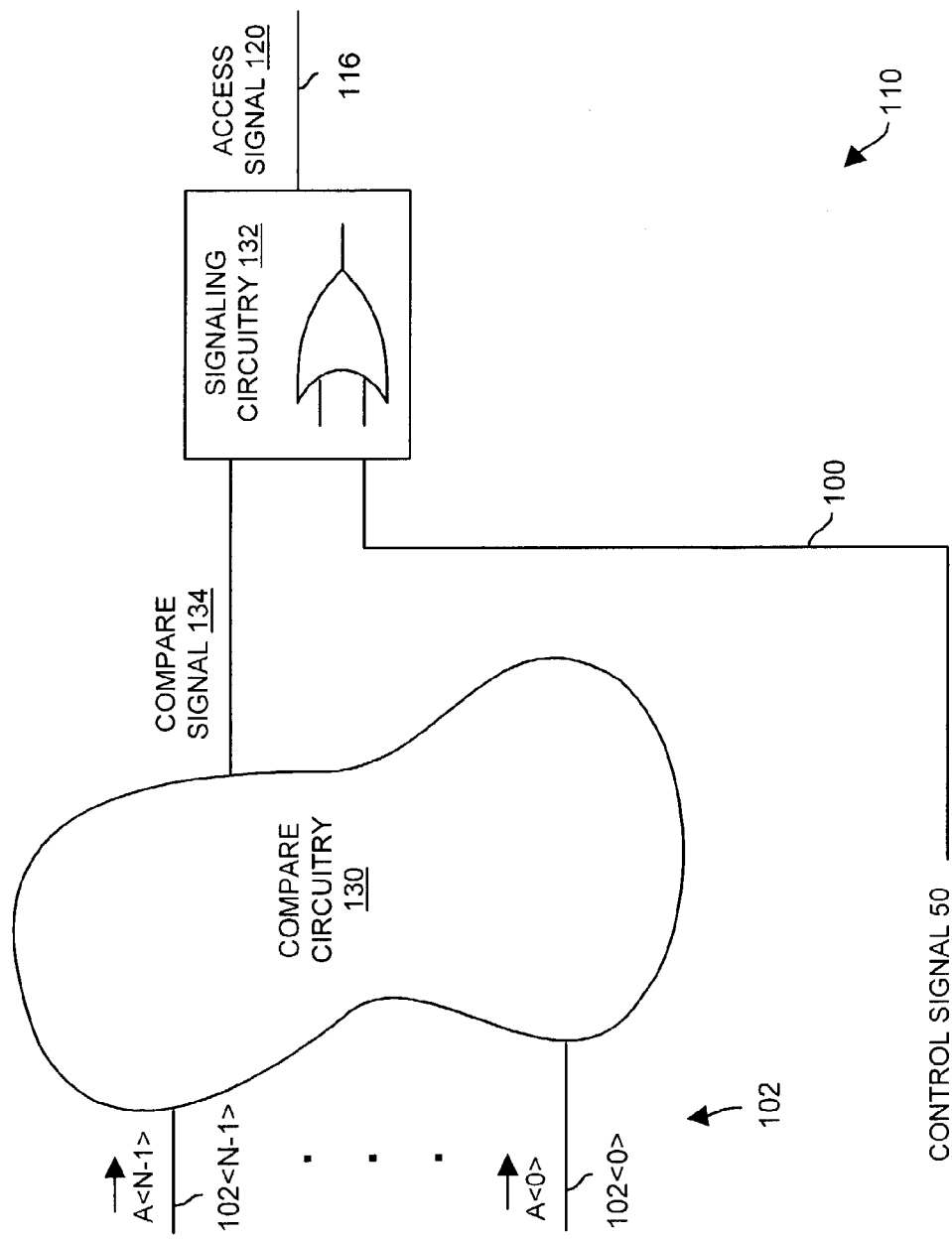
FIG. 4 is a block diagram of front-end circuitry of the addressing circuit of FIG. 3.

FIG. 4 shows a block diagram of the front-end circuitry 110 of the addressing circuit 24. The front-end circuitry 110 includes compare circuitry 130 and signaling circuitry 132. The compare circuitry 130 is interconnected between the set of inputs 102 and the signaling circuitry 132. The signaling circuitry 132 is interconnected between the control line 100, the compare circuitry 130 and the connection 116.

N represents the number of address bits in the least significant address portions 62 of the addresses 60. That is, there are N low order address bits A<0>, . . . , A<N−1> in each least significant address portion 62 and thus N inputs 102<0>, . . . , 102<N−1> for processing the low order address bits A<0>, . . . , A<N−1>. Accordingly, there are also N address signals 66 and N address lines 42 connected to the N inputs 102 (also see FIG. 1).

During operation, the compare circuitry 130 (e.g., combinatorial digital logic) is configured to perform compare operations, and the signaling circuitry 132 is configured to perform logical OR operations. In particular, when a processor 22 provides an address 60 onto the address bus 34 (also see FIG. 1), the compare circuitry 130 (i) receives, through the set of inputs 102, the set of addressing signals 66 defining the least significant address portion 62 of that address 60 (also see FIG. 3), and (ii) provides a compare signal 134 based on a comparison of the least significant address portion 62 to the predefined range corresponding to the special areas 58 of the memory segments 52. The compare signal 134 has a first value (e.g., a high voltage) when the least significant address portion 62 falls outside the predefined range, and a second value (e.g., a low voltage) when the least significant portion 62 falls within the predefined range.

When the control signal 50 places the addressing circuit 24 in the normal operating mode (e.g., when the control signal 50 has a low voltage), the signaling circuitry 132 is configured to provide the access signal 120 in response to the compare signal 134. In particular, the signaling circuitry 132 provides the access signal 120 so that the access signal 120 mirrors the compare signal 134. As a result, when the compare signal 134 indicates that the least significant address portion 62 identifies a memory location 54 within the normal area 56 of a memory segment 52, the access signal 120 has a first value (e.g., a high voltage) also indicating that the least significant address portion 62 identifies a memory location 54 within the normal area 56 of a memory segment 52. Similarly, when the compare signal 134 indicates that the least significant address portion 62 identifies a memory location 54 within the special area 58 of a memory segment 52, the access signal 120 has a second value (e.g., a low voltage) also indicating that the least significant address portion 62 identifies a memory location 54 within the special area 58 of a memory segment 52.

In contrast, when the control signal 50 places the addressing circuit 24 in the override mode (e.g., when the control signal 50 has a high voltage), the signaling circuitry 132 outputs the access signal 120 with the first value (e.g., the high voltage) to indicate that the least significant address portion 62 identifies a memory location 54 within the normal area 56 of a memory segment 52 regardless of whether this is actually the case. Accordingly, when the control signal 50 has the second value, the operation of the addressing circuit 24 is essentially disabled thus bypassing the paging mechanism of the addressing circuit 24. As will be explained in further detail later, this feature is well-suited for special situations such as when making a copy of data within the memory 26 during a failsafe update procedure. Further details of the invention will now be provided with reference to FIG. 5.

Figure 5:
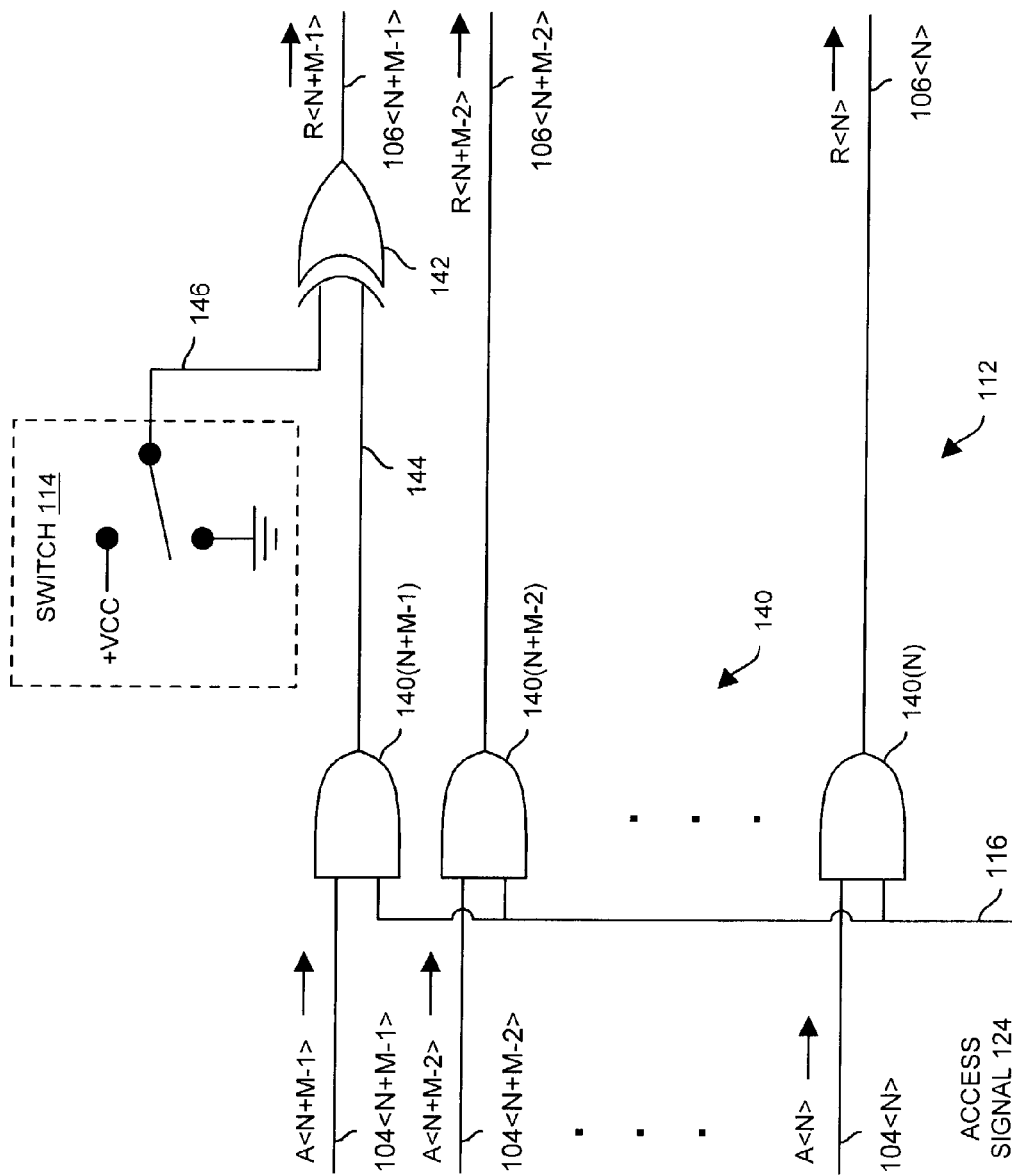
FIG. 5 is a block diagram of back-end circuitry and a switch of the addressing circuit of FIG. 3.

FIG. 5 is a block diagram of the back-end circuitry 112 and the switch 114 of the addressing circuit 24. The back-end circuitry 112 includes a set of logical AND devices 140 and a logical XOR device 142. The set of logical AND devices 140 is disposed between the set of inputs 104, the connection 116, the logical XOR device 142 and the set of outputs 106. The logical XOR device 142 is disposed between the switch 114, one of the logical AND devices 140 and one of the outputs 106.

The set of logical AND devices 140 is configured to receive the set of address signals 68 defining the most significant address portions 64 of the addresses 60. In particular, each logical AND device 140 includes a first input that receives a high order address bit, a second input that receives the access signal 120, and an output that provides a corresponding high order address bit equal to a logical AND operation of the first and second inputs. As a result, for each address 60, the set of logical AND devices 140 either (i) allows the most significant address portion 64 to pass through or (ii) masks the most significant address portion 64 with the most significant address portion 74 that identifies the predefined memory segment 52. M represents the number of address bits within the most significant address portions 64, 74. That is, there are M high order address bits A<N>, . . . , A<N+M−1> and thus M inputs 104<N>, . . . , 104<N+M−1> and M outputs 106<N>, . . . , 106<N+M−1>.

Furthermore, with the exception of a logical AND device 140(N+M−1) which handles the most significant address signal A<N+M−1>, the outputted high order address bit from each logical AND device 140 becomes one of the replacement address signals 70. The output of the logical AND device 140(N+M−1) leads to an input of the logical XOR device 142 which operates as either a pass-through (or mirroring) device or an inverter based on the position of the switch 114. Accordingly, the back-end circuitry 112 provides the replacement set of signals 70 (i.e., defining replacement high order address bits R<N>, . . . , R<N+M−1>) onto the set of outputs 106.

Further operational details of the switch 114 will now be provided. When the switch 114 is in a first operating position, the switch 114, in combination with the logical XOR device 142, allows the highest order address signal to simply pass through. However, when the switch 114 is in a second position, the switch 114, in combination with the logical XOR device 142, inverts the highest order address signal. Inversion of the highest order address signal essentially enables swapping of the memory space halves 82-A, 82-B within the memory 26. In particular, when the switch 114 and the logical XOR device 142 allow the highest order address signal to pass through, the memory segment 52(0) is the lowest addressable memory segment 52, the memory segment 52(S) is the highest addressable memory segment 52, and the addresses of the memory segments 52 increases therebetween.

However, when the switch 114 and the logical XOR device 142 inverts the highest order address signal, the memory segment 52(R) is the lowest addressable memory segment 52 and the addresses increase up to the memory segment 52(S). Then, the addresses continue to increase from the memory segment 52(0) until the memory segment 52(R−1) which is the highest addressable memory segment 52. Accordingly, changing the position of the switch 114 between the first and second positions effectively swaps addressing of the memory space halves 82-A, 82-B.

In one arrangement, the switch 114 is a jumper (e.g., a hard-wired mechanical coupler that is configured to insert over a pair of pins) that provides a first value (e.g., a high voltage) when in the first operating position, and a second value (e.g., a low voltage) when in the second operating position. Further details of the inverting operation of the switch 114 will be provided later with reference to a special situation of making a copy of data within the memory 26 for a failsafe update process. Further details of the invention will now be provided with reference to FIGS. 6 and 7.

Figure 6:
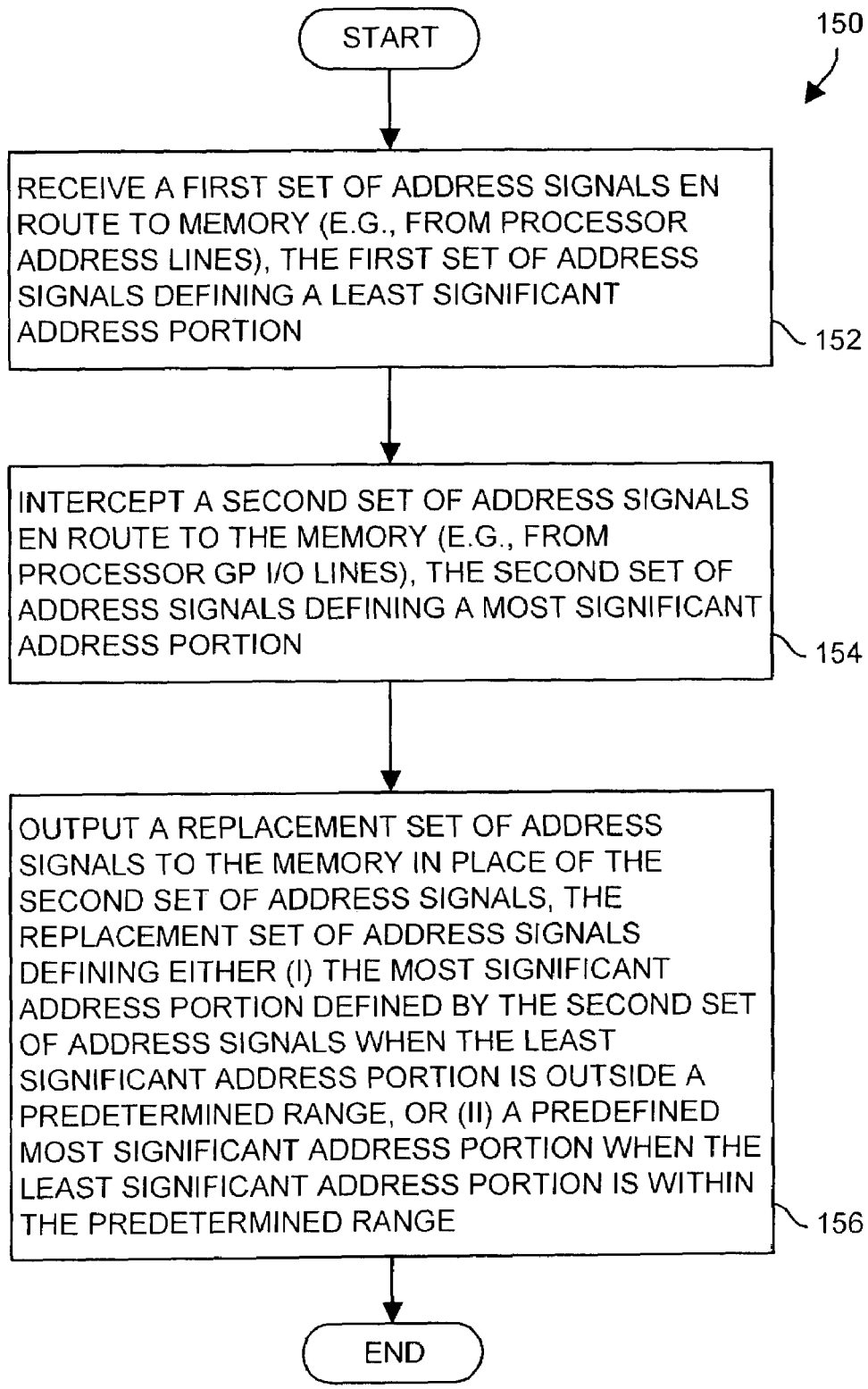
FIG. 6 is a flowchart of a procedure which is performed by the addressing circuit of FIG. 3.

FIG. 6 shows a flowchart of a procedure 150 summarizing the operation of the addressing circuit 24 when processing an address 60 from the set of processors 22. In step 152, the addressing circuit 24 receives the set of address signals 66 en route to the memory 26 from a processor 22 through the set of address lines 42 of the address bus 34 (FIG. 1). As mentioned earlier, the set of address signals 66 defines a least significant address portion 62 of the address 60 (FIG. 3). In one arrangement, the addressing circuit 24 receives the set of address signals 66 from standard address lines of the processor 22.

In step 154, the addressing circuit 24 intercepts the set of address signals 68 en route to the memory 26 from the processor 22 through the set of address lines 44 of the address bus 34 (FIG. 1). As mentioned earlier, the set of address signals 68 defines a most significant address portion 64 of the address 60 (FIG. 3). In one arrangement, the addressing circuit 24 receives the set of address signals 68 from GPIO lines of the processor 22. It should be understood that the addressing circuit 24 is capable of performing steps 152 and 154 concurrently if the processor 22 is configured to provide the sets of address signals 66, 68 concurrently as well.

In step 156, the addressing circuit 24 outputs the replacement set of address signals 70 to the memory 26 in place of the set of address signals 68 from the processor 22. The replacement set of address signals 70 defines the most significant address portion 64 of the address 60 when the least significant address portion 62 falls outside the predefined range that corresponds to the special areas 58 of the memory segments 52. Alternatively, the replacement set of address signals 70 defines the most significant address portion 74 identifying the predefined memory segment 52 when the least significant address portion 62 falls within the predefined range that corresponds to the special areas 58 of the memory segments 52.

Due to the above-described operation, the addressing circuit 24 provides normal access to memory locations 54 within the normal areas 56 of the memory segments 52, but steers all access directed to memory locations 54 within the special areas 58 of the memory segments 52 to the special area 58 of the predefined memory segment 52 (e.g., the special area 58(0) of the base memory segment 52(0) of the memory space 80, also see FIG. 2). As a result, the special area 58 of the predefined memory segment 52 is particularly well-suited for storing critical data such as a startup procedure for the set of processors 22, i.e., the addressing circuit 24 enables each processor 22 to reliably and consistently access the special area 58 of the predefined memory segment 52 even if the processors 22 identify memory segments using GPIO lines which are not yet reliably under software control.

Figure 7:
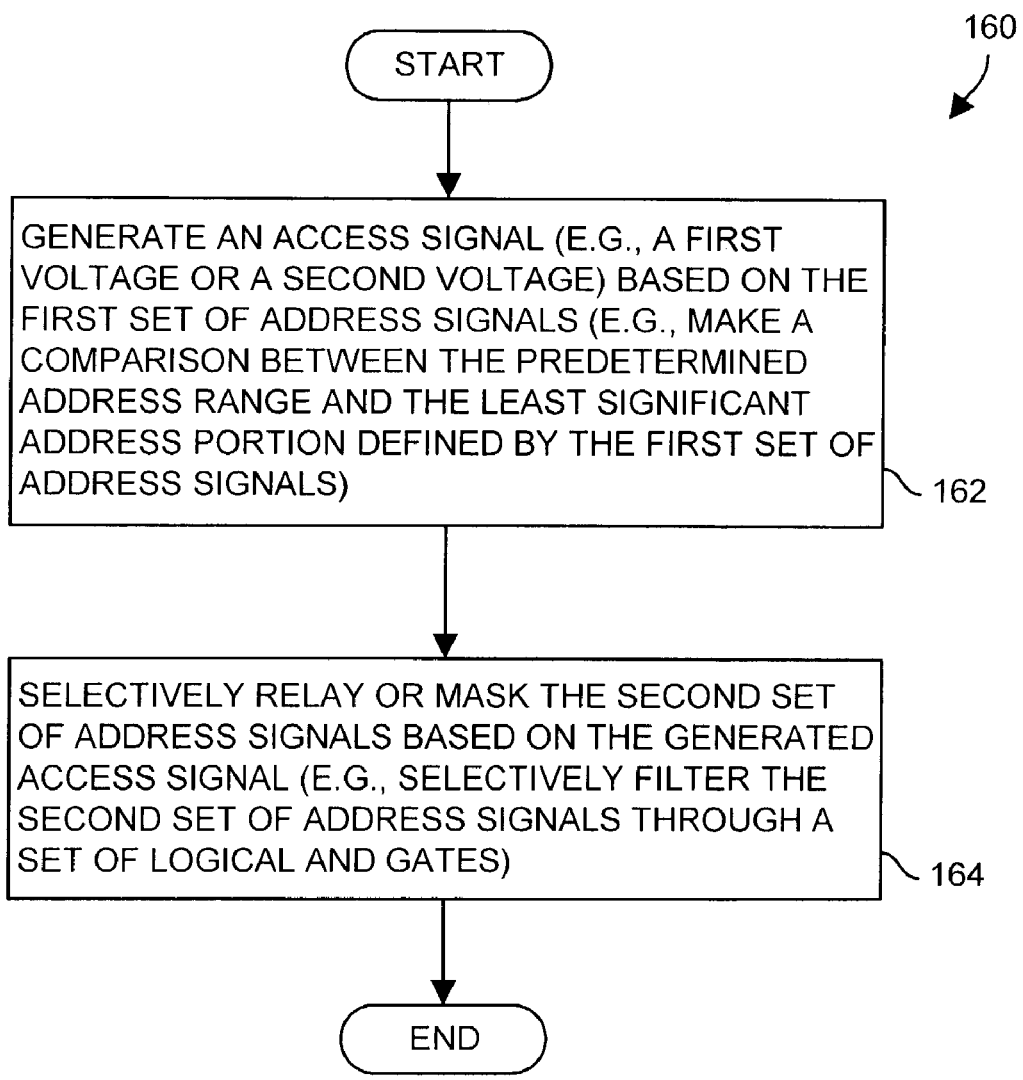
FIG. 7 is a flowchart of one of the steps of the procedure of FIG. 6.

FIG. 7 shows a flowchart of a procedure 160 summarizing the operation of particular circuits within the addressing circuit 24 during step 156 of FIG. 6. In step 162, the front-end circuitry 110 of the addressing circuit 24 generates the access signal 120 based on the set of address signals 68 from the set of processors 22. In particular, the front-end circuitry 110 compares the least significant address portion 62 defined by the set of address signals 66 with the predefined range corresponding to the special areas 58 of the memory segments 52. If the least significant address portion 62 falls outside the predefined range, the front-end circuitry 110 provides the access signal 120 with a first voltage (e.g., a high voltage). However, if the least significant address portion 62 falls within the predefined range, the front-end circuitry 110 provides the access signal 120 with a second voltage (e.g., a low voltage).

In step 164, the back-end circuitry 112 of the addressing circuit 24 selectively relays or masks the most significant address portion 64 defined by the set of address signals 68 from the set of processors 22 based on the access signal 120. In particular, the back-end circuitry 24 operates as a pass-through or relay device by making the replacement set of address signals 70 mirror the set of address signals 68 when the access signal 120 indicates that the least significant address portion 62 falls outside the predefined range (e.g., when the access signal 120 has the first voltage). In contrast, the back-end circuitry 24 operates as a masking or filtering device by forcing the replacement set of address signals 70 to identify the predefined memory segment 52 (e.g., the base memory segment 52(0) of FIG. 2) when the access signal 120 indicates that the least significant address portion 62 falls within the predefined range (i.e., when the access signal 120 has the second voltage). Accordingly, the addressing circuit 24 controls selection of memory segments 52 within the memory 26. Further details of the invention will now be provided with reference to FIG. 8 and the following example.

Figure 8:
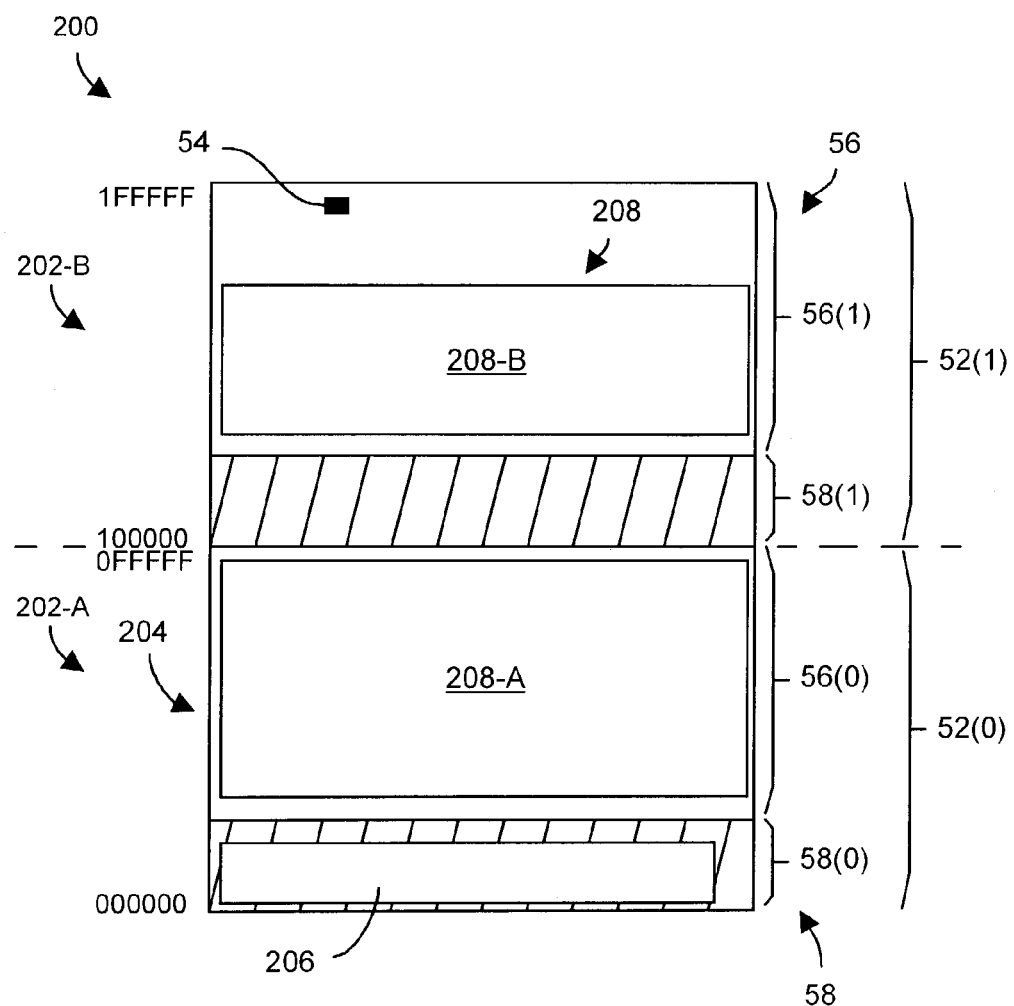
FIG. 8 is a block diagram of a memory space used by the computerized system of FIG. 1 in connection with a particular example implementation.

FIG. 8 shows a memory space 200 which is suitable for use by the computerized system 20. The memory space 200 resides within the memory 26 (FIG. 1) and includes a set of uniformly-sized memory segments 52. Each memory segment 52 includes memory locations 54 (e.g., bytes) which are grouped into a normal area 56 and a special area 58. The size and positions of the normal area 56 and the special area 58 are consistent from memory segment 52 to memory segment 52.

By way of example only, the memory space 200 is two megabytes in size and includes one-megabyte memory segments 52(0), 52(1). It should be understood that the memory space 200 includes only two memory segments 52 for simplicity, but that other arrangements include more than two memory segments 52. Each memory segment 52 has a normal area 56 that occupies the top three-quarters of that memory segment 52 (i.e., a 768 KB region) and (ii) a special area 58 that occupies the lowest quarter of that memory segment 52 (i.e., a 256 KB region). Accordingly, the corresponding predefined range used by the addressing circuit 24 spans a 256 KB area between addresses 0x000000 and 0x03FFFF.

To access the memory space 200 within the memory 26, the manufacturer provides, for the set of processors 22, multiple processors and circuitry for coordinating contention issues with the set of connections 28 (FIG. 1). By way of example only, each processor 22 has exactly 20 standard processor address lines and one GPIO line for use in addressing the memory locations 54 of the memory segments 52. Accordingly, the native memory capacity for each processor 22 is one megabyte, i.e., the 20 standard processor address lines provides 2^20 addresses equaling one megabyte of addresses. Furthermore, the total memory capacity for each processor 22 is two megabytes, i.e., the 20 standard processor address lines in combination with the one GPIO line provides 2^21 addresses equaling two megabytes.

Based on the above-provided information, it should be understood that the address bus 34 of the computerized system 20 is 21 lines deep (also see FIG. 1). In particular, the address bus 34 includes 20 address lines 42 that connect to the standard processor address lines of each processor 22, the addressing circuit 24 and the memory 26 (i.e., N equals 20 in FIG. 4). Additionally, the address bus 34 includes one address line 44 that interconnects the GPIO lines of the processors 22 with the addressing circuit 24 and, in a mirroring manner, one address line 46 that interconnects the addressing circuit 24 to the memory 26 (i.e., N equals 20 and M equals one in FIG. 5). It should be understood that, in this example, there is only one logical AND device 140, i.e., the logical AND device 140(20) (see the logical AND device 140(N+M-1) in FIG. 5) which provides an output signal into the logical XOR device 142.

Recall that the general memory space 80 of FIG. 2 includes two halves 82-A, 82-B and that the switch 114 (FIG. 5) controls addressing of the two halves 82-A, 82-B. In particular, when the switch 114 is in the first position (e.g., connected to GND), the logical XOR device 142 mirrors the output signal of the logical AND device 140(N+M-1) and thus the memory segment 52(0) is the lowest addressable memory segment 52 and the addresses for the memory segments 52 increases through to the memory segment 52(S) which is the highest addressable memory segment 52. In contrast, when the switch 114 is in the second position (e.g., connected to +VCC), the logical XOR device 142 inverts the output signal of the logical AND device 140(N+M-1) which essentially flips addressing of the memory space halves 82-A, 82-B. That is, when the switch 114 is in the second position, the memory segment 56(R) is the lowest addressable memory segment 52 and the addressing of memory segments 52 increases through the memory segment 52(S), then from the memory segment 52(0) through the memory segment 52(R-1) which is the highest addressable memory segment 52.

With reference now directed back to the memory space 200 of FIG. 8, the memory space 200 is divided into two halves 202-A, 202-B in a manner similar to that of the general memory space 80 of FIG. 2. When the switch 114 is in the first position, the memory segment 52(0) is the lowest addressable memory segment 52 and the memory segment 52(1) is the highest addressable memory segment 52. When the switch 114 is in the second position, the memory segment 52(1) is the lowest addressable memory segment 52 and the memory segment 52(0) is the highest addressable memory segment 52.

By way of example only, the switch 114 is initially in the first position. Accordingly, the memory segment 52(0) is the lowest addressable memory segment 52 and the memory segment 52(1) is the highest addressable memory segment 52. In particular, the first half 202-A of the memory space 200 spans addresses 0x000000 through 0x0FFFFF, and the second half 202-B of the memory space 200 spans addresses 0x100000 through 0x1FFFFF. If the switch 114 setting is later changed to the second position, the first half 202-A of the memory space 200 will span addresses 0x 100000 through 0x1FFFFF, and the second half 202-B of the memory space 200 will span addresses 0x000000 through 0x0FFFFF due to inversion of the highest order address bit (also see the logical XOR device 142 of FIG. 5).

In this example, the memory 26 is a flash PROM circuit which is rewritable under software control, and the manufacturer stores data 204 within the memory 26. In particular, the manufacturer stores (i) critical code 206 and supplemental code 208. The critical code 206 includes instructions for initializing and controlling processor circuitry (e.g., initialization routines, an exception handler table, routines for handling various traps and software conditions, CALLs to a higher level application that places the processor GPIO lines under software control, etc.) and is disposed within the special area 58(0) of the predefined memory segment 52(0) at a predefined starting address (i.e., an entry point address of the memory segment 52(0)).

The supplemental code 208 includes other important firmware and is disposed outside the special area 58(0) of the predefined memory segment 52(0). By way of example only, the supplemental code 208 is too large to fit within only the normal area 56(0) of the predefined memory segment 52(0). The manufacturer strategically places power-on self-test (POST) routines 208-A in normal area 56(0) of the predefined memory segment 52(0) and other material 208-B (e.g., configuration data, diagnostic procedures and utilities, etc.) in the normal areas 56 of the remaining memory segments 52 (i.e., the memory segment 52(1)).

It should be understood that supplemental code 208 extends across multiple normal areas 56 of the memory segments 52. However, the startup sequence code 206 resides only in the special area 58(0) of the predefined memory segment 52(0), and does not extend across multiple special areas 58 since the addressing circuit 24 aliases all special areas 58 to the special area 58(0) of the predefined memory segment 52(0).

During operation, each processor 22 is configured to execute from the critical code 206 beginning at the predefined starting address after an occurrence of a critical event such as immediately after a power-on event, after receiving a reset signal, after encountering a fault event, etc. During this time, the GPIO lines of each processor 22 are not reliably be in a stable and consistent state under software control. Rather, the GPIO lines (including the GPIO line that is designated for use as an address line) are in an indeterminate state and perhaps are even allowed to vary. As the processors 22 execute the critical code 206 to initialize and become ready, they may reliably CALL the POST routines within the normal area 56(0) of the predefined memory segment 52(0) with the return address of each CALL directing execution back within the special area 58(0). Following completion of the startup process (e.g., after each processor 22 completes execution of the critical code 206 and any POST routines), the processors 22 are then capable of accessing memory locations 54 in any of the memory segments 52 because the GPIO lines are now reliably under software control (i.e., under the direction of an application stored in primary memory and/or secondary memory). That is, each processor 22 is now fully initialized and well-configured to operate normally, e.g., now running one or more higher level applications such as an operating system, user applications, etc.

It should be understood that, while the processors 22 accesses the critical code 206, there is no opportunity for a processor GPIO line which was designated for use as an address line to cause the processors 22 to inadvertently cause the processors 22 to access an incorrect memory segment 52. In particular, the critical code 206 resides within the special area 58(0) of the predefined memory segment 52(0). During normal operation of the addressing circuit 24, the addressing circuit 24 automatically directs any attempted access of the special area 58 a memory segment 52 to the special area 58(0) of the predefined memory segment 52(0). Accordingly, if one of the GPIO lines which is not yet reliably under software control inadvertently provides an incorrect signal during addressing of a memory location 54 within the special area 58(0), the addressing circuit 24 nevertheless corrects this inadvertency by providing the address 72 (FIG. 1) with the most significant address portion 74 which identifies the predefined memory segment 52(0).

Thus, in contrast to a conventional simple GPIO line approach to simply utilizing GPIO lines as address lines, the invention is not susceptible to incorrect addressing by a GPIO line that is not yet reliably under software control even if incorrect assertion of the GPIO line occurs from another processor that is not involved with currently addressing memory. More specifically, because the addressing circuit 24 directs all of the processors 22 execute out of the special area 58(0) of the predefined memory segment 52(0), an inadvertent attempt by any processor 22 to modify its GPIO line to direct access to the special area 58 of a different memory segment 52 has no effect. Rather, all special area access operations are correctly satisfied from the special area 58(0) of the predefined memory segment 52(0). Moreover, due to the manner in which the addressing circuit 24 operates, there is no GPIO line interference between the processors 22 even if there exists some asynchrony between the processors 22. Further details of an updating feature of the invention will now be provided with reference to FIG. 9.

Figure 9:
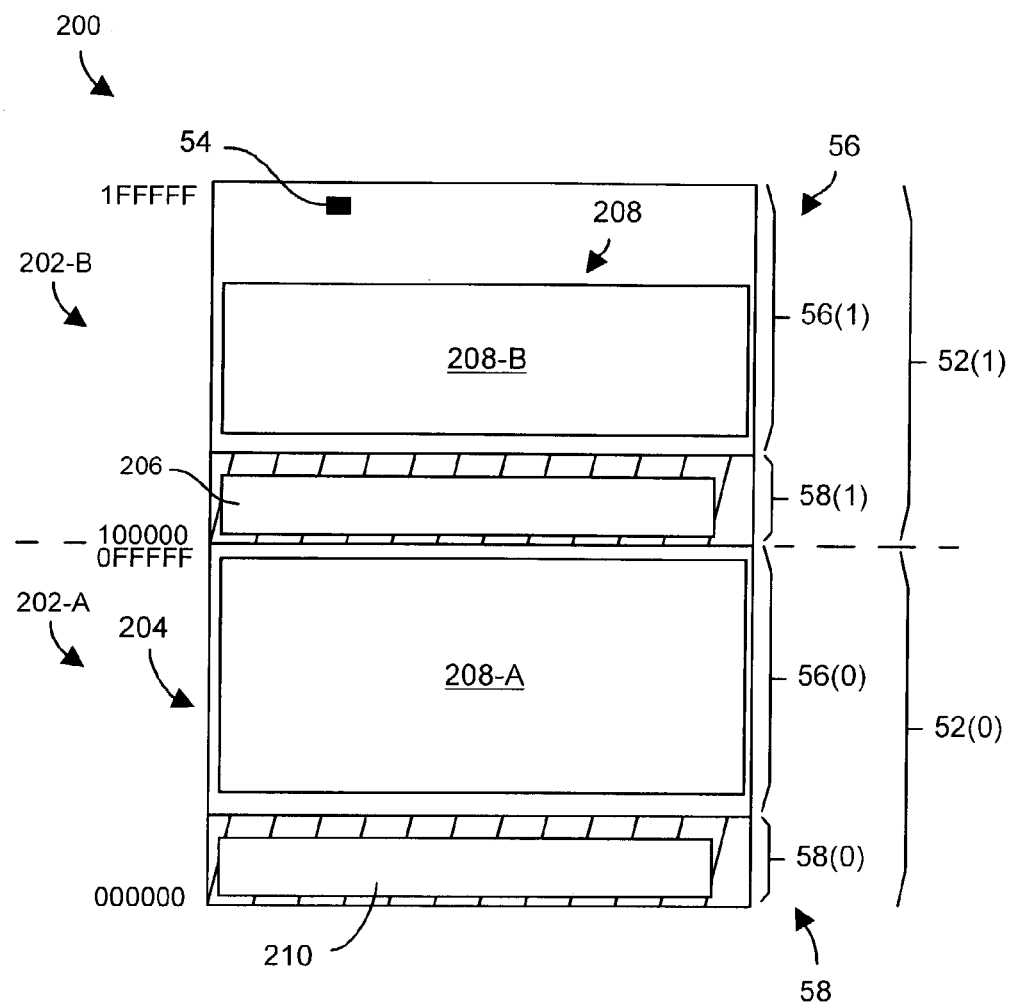
FIG. 9 is a block diagram of the memory space of FIG. 8 during a failsafe update procedure.

FIG. 9 shows the memory space 200 of FIG. 8 during a firmware update process. Suppose that the user wishes to replace the original critical code 206 within the special area 58(0) of the predefined memory segment 52(0) with new critical code 210 (e.g., the user wishes to perform a field update on all or part of the firmware). To this end, the user modifies the control signal 50 on the control signal input line 48 (FIG. 1) to disable or override the operation of the addressing circuit 24 (e.g., the user changes the control signal 50 so that it has a high voltage value rather than a low voltage value). Accordingly, the addressing circuit 24 now operates as a simple pass-through device and the set of processors 22 is now capable of addressing the special area 58 of any memory segment 52.

As shown in FIG. 9, the user then copies the original critical code 206 to the special area 58 of the lowest addressable memory segment 52 of the upper half 202-B of the memory space 200, namely the special area 58(1) of the memory segment 52(1). Here, the set of processors 22 is able to purposefully access the special area 58(1) of the memory segment 52(1) within the memory 26 (e.g., under direction of the user performing the update process) since the operation of the addressing circuit 24 is now bypassed using the control signal 50. In particular, the memory 26 is flash PROM circuitry, and the user copies the original critical code 206 into the special area 58(1) using a flash PROM writing technique. The original critical code 206 is now essentially backed-up within the memory 26.

Next, the user stores the new critical code 210 within the special area 58(0) of the predefined memory segment 52(0) and subsequently modifies the control signal 50 to re-enable the operation of the addressing circuit 24 (e.g., the user changes the control signal 50 so that it has the low voltage value again). In particular, the user writes the new critical code 210 into the special area 58(0) using the flash PROM writing technique. At this point, the processors 22 are now capable of executing a new startup sequence from the new critical code 210 rather than from the original critical code 206 in a normal manner. If the user wishes to update the original supplemental code 208, the user may simply overwrite the original supplemental code 208 with new supplemental code at this time as well.

It should be understood that the above-described procedure is inherently failsafe since the original critical code 206 continues to exist within the memory 26. In particular, the original critical code 206 within the special area 56(0) of the predefined memory segment 52(0) is never overwritten until a usable copy is made to another part of the flash PROM. That is, if newly written memory locations 54 within the flash PROM memory 26 are somehow corrupted during the update process, the computerized system 20 remains completely functional. For example, if an error occurs during the process of copying the original critical code 206 from the special area 58(0) to the special area 58(1) causing the special area 58(1) to become un-accessible, the original critical code 206 remains in place within the special area 58(0) so that the computerized system 20 is capable of continuing normal operation until the memory 26 is fixed.

Additionally, if an error occurs during the process of writing the new version of the critical code 210 to the special area 58(0) causing the special area 58(0) to become un-accessible (after copying the original critical code 206 to the special area 58(1)), the copy of the original critical code 206 in the special area 58(1) remains available so that the computerized system 20 is capable of continuing normal operation until the memory 26 is fixed. This is also the case if a good software image (e.g., the original critical code 206) is replaced with a corrupt image (e.g., the new version of the critical code 210), i.e., the original critical code 206 remains available in the special area 58(1).

When normal operation using the copy of the critical code 206 in the special area 58(1) is desired, the user changes the position of the switch 114 (e.g., by moving a physical jumper) from the first position to the second position to flip the addressing mapping of the memory space 200 so that the memory space half 202-B is now the bottom half 202 of the memory space 200. As a result, the memory space halves 202-A, 202-B swap. That is, the processors 22 and the addressing circuit 24 now view the memory segment 52(1) as the predefined memory segment 52, and the addressing circuit 24 directs any attempts to access the special area 58 of a memory segment 52 to the new predefined memory segment 52(1). Accordingly, all addresses 72 from the addressing circuit 24 which address a special area 58 within the memory 26 now identify the memory segment 52(1) as the predefined memory segment 52 thus maintaining reliable access to the original critical code 206 in case of a critical event (e.g., an exception). In particular, when the set of processors 22 output addresses 0x000000 through 0x0FFFFF, the addressing circuit 24 translates these addresses to the memory space half 202-B. If the swapping of memory space halves 202-A, 202-B resulted from an error writing the new critical code 210 to the special area 58(0), the computerized system 20 is capable of continuing operation in a completely functional manner, and the user may replace the memory 26 and complete the update process at a more convenient time.

The example above shows that the invention is well-suited for providing a set of processors 22 with access to a memory space 200 that is greater than the native memory capacities of the processors 22. The invention is multi-processor compatible and provides a failsafe flash update feature for updating important data stored within a designated special area 58 of a predefined memory segment 52 with a new version of that data.

As described above, embodiments of the invention are directed to techniques for controlling processor access to a set of memory segments 52. In particular, an addressing circuit 24 replaces portions 64 of addresses 60 from a set of processors 22 such that any attempt to address a memory location 54 within a particular memory segment range (i.e., a special area 58) results in access of a memory location 54 from that range within a predefined memory segment 52. Such techniques are well-suited for guiding the processors 22 to important information in the particular memory segment range of the predefined memory segment 52 (e.g., critical code 206) in a reliable and consistent manner even if the processors 22 initially provide the portions 64 of the addresses 60 on GPIO lines that are not yet reliably under software control. Moreover, such techniques enable manufacturers to utilize GPIO lines as additional address lines, thereby alleviating the need to replace processors 22 with new processors having more address lines when the manufacturers provide new versions of firmware that exceed the native memory capacities of the processors 22.

Based on the invention as described above, when manufacturers are faced with the issue of running out of physical memory space (e.g., new versions of firmware which no longer fit within the confines of a processor's native memory capacity), the manufacturers do not need to implement conventional approaches such as using a new processor with more standard address lines. Rather, the manufacturers may expand beyond the processor's native addressing capability and reliably utilize processor GPIO lines without concern of incorrect addressing due to GPIO lines that are not yet under software control.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the computerized system 20 is capable of working with other computerized components beyond those mentioned above. In particular, the computerized system 20 is capable of utilizing random access memory (e.g., semiconductor memory), non-volatile memory (e.g., a set of disk drives, tape drives, etc.), input/output (I/O) devices (e.g., a display, a mouse, a keyboard, a printer, a network interface for remote client access, etc.), and other devices. Such components enhance the capabilities of the computerized system 20 for example by improving the robustness and reliability of the system 20.

Additionally, it should be understood that the computerized system 20 is suitable for use in a variety of situations. For example, the computerized system 20 is well suited for use as or part of a general purpose computer system, a data storage system, a data communications device, a server, a client, a specialized computer, etc.

Furthermore, it should be understood that the processors 22 were described above as including separate sets of lines for commands and addresses. In other arrangements, the processors 22 multiplex the operation of certain lines (e.g., a single command/address bus) and both the addressing circuit 24 and the memory 26 are configured to process addresses and other information through the set of connections 28 in a similar multiplexed manner (e.g., reading and sending information in particular time slices, etc.).

Additionally, it should be understood that the set of processors 22 were described above as including multiple processors 22. It should be understood that the computerized system 20 is capable of operating as a single processor system as well.

Furthermore, it should be understood that the memory 26 was described above as being PROM by way of example only. In other arrangements, the memory 26 is not simply a PROM circuit but includes other types of memory such as RAM, magnetic memory, CD-ROM, combinations thereof, etc. Moreover, the memory 26 is well-suited for storing information other than traditional firmware. For example, the memory 26 is capable of being used as primary cache memory, secondary memory, redundant memory for fault tolerance, local memory, distributed memory, etc.

Additionally, it should be understood that the example above utilized only one processor GPIO line and that the memory space 200 includes only two memory segments 52 for simplicity. Other arrangements include the use of multiple processor GPIO lines and provide reliable access to a memory space with more than two memory segments 52 (e.g., see the mapping of the general memory space 80 in FIG. 2). Accordingly, the entire memory capacity is expandable to $2^{(N+M)}$ bytes, where N is the number of standard processor address lines, and M is the number of processor GPIO lines used for addressing.

Furthermore, it should be understood that the location of special areas 58 was described as being in the lower portions of the memory segments 52 by way of example only. In other arrangements, all of the special areas 58 are consistently in other locations within the memory segments 52 (i.e., the offset is same in each memory segment 52) such as in the middle or at the top. For such other arrangements, the addressing circuit 24 is configured to compare the least significant address portions 62 (FIG. 3) to a predefined address range that corresponds to the other locations.

Additionally, it should be understood that the predefined memory segment 52 was described above as being the lowest addressable memory segment 52 by way of example only. In other arrangements, the predefined memory segment 52 is not the lowest addressable memory segment 52 but is in a different location within the memory 26. In such arrangements, the addressing circuit 24 is configured to provide, as the most significant address portion 74 (FIG. 3), address bits that identify that different location for the predefined memory segment 52. To define a different memory segment 52 as the predefined memory segment 52, the designer simply adjusts the combinatorial logic within the addressing circuit 24 (see the set of logical AND device 140) to selectively provide pass-through operation or a bit pattern identifying the predefined memory segment 52.

Furthermore, it should be understood that the size of the memory segments 52 were described above as being one megabyte, and the size of the special areas 58 were described above as being 256 KB by way of example only. Other sizes for the memory segments 52 and the special areas 58 are suitable for use by the invention as well. For example, the special area 58 is a range of 2^K addresses, and the K is set so that the special area 58 is large enough to so that the special area 58 contains the desired data (e.g., the critical code 206, 210 having the system's power-on reset entry point and exception handling tables).

What is claimed is:

1. A method for addressing memory, the method comprising:
   receiving a first set of address signals en route to the memory, the first set of address signals defining a least significant address portion;
   intercepting a second set of address signals en route to the memory, the second set of address signals defining a most significant address portion; and
   outputting a replacement set of address signals to the memory in place of the second set of address signals, the replacement set of address signals defining one of (i) the most significant address portion defined by the second set of address signals when the least significant address portion is outside a predetermined range, and (ii) a predefined most significant address portion when the least significant address portion is within the predetermined range.

2. The method of claim 1 wherein outputting the replacement set of address signals includes:
   generating an access signal based on the first set of address signals, the access signal indicating whether the least significant address portion is outside the predetermined range; and
   forming the replacement set of address signals based on the access signal.

3. The method of claim 2 wherein forming the replacement set of address signals includes:
   performing one of (i) relaying and (ii) masking the most significant address portion defined by the second set of address signals based on the access signal.

4. The method of claim 2 wherein generating the access signal includes:
   making a comparison between the predetermined range and the least significant address portion defined by the first set of address signals; and
   providing, as the access signal, one of a first voltage indicating that the least significant address portion is outside the predetermined range and a second voltage indicating that the least significant address portion is within the predetermined range, based on the comparison between the predetermined range and the least significant address portion defined by the first set of address signals.

5. The method of claim 4 wherein providing includes:
   conveying the access signal from an output of a logical OR device having (i) a first input which is configured to receive a compare signal indicating whether the least significant address portion defined by the first set of address signals is outside the predetermined range, and (ii) a second input which is configured to receive an override signal that forces the access signal to have the first voltage when the override signal has a predetermined voltage value.

6. The method of claim 1 wherein the memory includes multiple memory segments, and wherein outputting the replacement set of address signals defining the predefined most significant address portion when the least significant address portion is within the predetermined range includes:
   selecting a first memory segment when a switch resides in a first position; and
   selecting a second memory segment that is different from the first memory segment when the switch resides in a second position that is different than the first position.

7. The method of claim 1 wherein the memory includes multiple memory segments, wherein each memory segment includes a normal area and a special area, and wherein outputting the replacement set of address signals defining the predefined most significant address portion when the least significant address portion is within the predetermined range includes:
   selecting a predefined memory segment of the multiple memory segments to access the special area of the predefined memory segment.

8. A method according to claim 7, wherein the special area of the predefined memory segment stores code for a startup sequence that, when executed by a processor, places general-purpose input/output (GPIO) lines of the processor reliably under software control for use as the high order address lines on which the second set of address signals are carried.

9. A method according to claim 8, wherein the GPIO lines have an undetermined and potentially incorrect state prior to being placed under software control.

10. The method of claim 1 wherein receiving the first set of address signals includes inputting the first set of address signals from a set of processor address lines, and wherein intercepting the second set of address signals includes inputting the second set of address signals from a set of processor general purpose input/output lines.

11. A method according to claim 10, wherein the set of processor general purpose input/output lines are used as software-controlled address lines to expand the addressable memory space of the set of processors beyond the native memory capacity of the set of processors.

12. A method according to claim 11, wherein the set of processor general purpose input/output lines have an undetermined and potentially incorrect state prior to being placed under software control.

13. The method of claim 1 wherein the memory includes Programmable Read Only Memory, and wherein outputting the replacement set of address signals to the memory includes:
   transmitting the replacement set of address signals to the Programmable Read Only Memory.

14. A computerized system, comprising:
   a set of processors;
   memory; and
   an addressing circuit coupled to the set of processors and the memory, the addressing circuit being configured to address the memory, the addressing circuit including:
   a first set of inputs coupled to the set of processors, the first set of inputs being configured to receive a first set of address signals en route from the set of processors to the memory, the first set of address signals defining a least significant address portion;

a second set of inputs coupled to the set of processors, the second set of inputs being configured to intercept a second set of address signals en route from the set of processors to the memory, the second set of address signals defining a most significant address portion; and control circuitry coupled to the first and second sets of inputs, the control circuitry being configured to output a replacement set of address signals to the memory in place of the second set of address signals, the replacement set of address signals defining one of (i) the most significant address portion defined by the second set of address signals when the least significant address portion is outside a predetermined range, and (ii) a predefined most significant address portion when the least significant address portion is within the predetermined range.

15. The computerized system of claim 14 wherein the control circuitry of the addressing circuit includes:

front-end circuitry which is configured to generate an access signal based on the first set of address signals, the access signal indicating whether the least significant address portion is outside the predetermined range; and back-end circuitry coupled to the front-end circuitry, the back-end circuitry being configured to form the replacement set of address signals based on the access signal.

16. The computerized system of claim 15 wherein the back-end circuitry of the addressing circuit includes:

a set of logical AND devices which is configured to selectively relay and mask the second set of address signals based on the access signal.

17. The computerized system of claim 15 wherein the front-end circuitry of the addressing circuit includes:

compare circuitry which is configured to make a comparison between the predetermined range and the least significant address portion defined by the first set of address signals; and signaling circuitry coupled to the compare circuitry, the signaling circuitry being configured to provide, as the access signal, one of a first voltage indicating that the least significant address portion is outside the predetermined range and a second voltage indicating that the least significant address portion is within the predetermined range, based on the comparison between the predetermined range and the least significant address portion defined by the first set of address signals.

18. The computerized system of claim 17 wherein the signaling circuitry includes:

a logical OR device having a first input which is configured to receive a compare signal indicating whether the least significant address portion defined by the first set of address signals is outside the predetermined range, a second input which is configured to receive an override signal, and an output which is configured to provide the access signal, the logical OR device being configured to force the access signal to have the first voltage when the override signal has a predetermined voltage value.

19. The computerized system of claim 14 the memory includes multiple memory segments, and wherein the control circuitry of the addressing circuit includes:

a switch; and back-end circuitry coupled to the switch, the back-end circuitry being configured to select a first memory segment when a switch resides in a first position, and select a second memory segment that is different from the first memory segment when the switch resides in a second position that is different than the first position.

20. The computerized system of claim 14 wherein the memory includes multiple memory segments, wherein each memory segment includes a normal area and a special area, and wherein the control circuitry is configured to select a predefined memory segment of the multiple memory segments to access the special area of the predefined memory segment when the least significant address portion is within the predetermined range.

21. The computerized system of claim 20, wherein the special area of the predefined memory segment stores code for a startup sequence that, when executed by a processor, places general-purpose input/output (GPIO) lines of the processor reliably under software control for use as the high order address lines on which the second set of address signals are carried.

22. The computerized system of claim 21, wherein the GPIO lines have an undetermined and potentially incorrect state prior to being placed under software control.

23. The computerized system of claim 14 wherein the first set of inputs of the addressing circuit connects to a set of address lines from the set of processors, the set of address lines interconnecting the set of processors with the memory, and wherein the second set of inputs connects to a set of general purpose input/output lines of the set of processors.

24. The computerized system of claim 23, wherein the set of general purpose input/output lines are used as software-controlled address lines to expand the addressable memory space of the set of processors beyond the native memory capacity of the set of processors.

25. The computerized system of claim 24, wherein the set of processor general purpose input/output lines have an undetermined and potentially incorrect state prior to being placed under software control.

26. The computerized system of claim 14 wherein the memory includes Programmable Read Only Memory.

27. An addressing circuit for addressing memory, the addressing circuit comprising:

a first set of inputs configured to receive a first set of address signals en route from a set of processors to the memory, the first set of address signals defining a least significant address portion;

a second set of inputs configured to intercept a second set of address signals en route from the set of processors to the memory, the second set of address signals defining a most significant address portion; and control circuitry coupled to the first and second sets of inputs, the control circuitry being configured to output a replacement set of address signals to the memory in place of the second set of address signals, the replacement set of address signals defining one of (i) the most significant address portion defined by the second set of address signals when the least significant address portion is outside a predetermined range, and (ii) a predefined most significant address portion when the least significant address portion is within the predetermined range.

28. The addressing circuit of claim 27 wherein the control circuitry includes:

front-end circuitry which is configured to generate an access signal based on the first set of address signals, the access signal indicating whether the least significant address portion is outside the predetermined range; and back-end circuitry coupled to the front-end circuitry, the back-end circuitry being configured to form the replacement set of address signals based on the access signal.

29. The addressing circuit of claim 28 wherein the back-end circuitry includes:
   a set of logical AND devices which is configured to selectively relay and mask the second set of address signals based on the access signal.

30. The addressing circuit of claim 28 wherein the front-end circuitry includes:
   compare circuitry which is configured to make a comparison between the predetermined range and the least significant address portion defined by the first set of address signals; and
   signaling circuitry coupled to the compare circuitry, the signaling circuitry being configured to provide, as the access signal, one of a first voltage indicating that the least significant address portion is outside the predetermined range and a second voltage indicating that the least significant address portion is within the predetermined range, based on the comparison between the predetermined range and the least significant address portion defined by the first set of address signals.

31. The addressing circuit of claim 30 wherein the signaling circuitry includes:
   a logical OR device having a first input which is configured to receive a compare signal indicating whether the least significant address portion defined by the first set of address signals is outside the predetermined range, a second input which is configured to receive an override signal, and an output which is configured to provide the access signal, the logical OR device being configured to force the access signal to have the first voltage when the override signal has a predetermined voltage value.

32. The addressing circuit of claim 27 the memory includes multiple memory segments, and wherein the control circuitry includes:
   a switch; and
   back-end circuitry coupled to the switch, the back-end circuitry being configured to select a first memory segment when a switch resides in a first position, and select a second memory segment that is different from the first memory segment when the switch resides in a second position that is different than the first position.

33. An addressing circuit for addressing memory, the addressing circuit comprising:
   a first set of inputs configured to receive a first set of address signals en route to the memory, the first set of address signals defining a least significant address portion;
   a second set of inputs configured to intercept a second set of address signals en route to the memory, the second set of address signals defining a most significant address portion; and
   means for outputting a replacement set of address signals to the memory in place of the second set of address signals, the replacement set of address signals defining one of (i) the most significant address portion defined by the second set of address signals when the least significant address portion is outside a predetermined range, and (ii) a predefined most significant address portion when the least significant address portion is within the predetermined range.

* * * * *